(12) United States Patent
Takiguchi et al.

(10) Patent No.: US 7,701,483 B1
(45) Date of Patent: Apr. 20, 2010

(54) IMAGE INPUT SYSTEM CONNECTABLE TO AN IMAGE INPUT DEVICE HAVING A PLURALITY OF OPERATION MODES

(75) Inventors: Hideo Takiguchi, Kawasaki (JP); Atsushi Kumagai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 559 days.

(21) Appl. No.: 09/400,154

(22) Filed: Sep. 21, 1999

(30) Foreign Application Priority Data

Sep. 22, 1998 (JP) ................................. 10-268606

(51) Int. Cl.
*H04N 5/225* (2006.01)
(52) U.S. Cl. ............................................... 348/207.11
(58) Field of Classification Search .............. 348/207.1, 348/207.11
See application file for complete search history.

(56) References Cited

U.S. PATENT DOCUMENTS

| | | | | |
|---|---|---|---|---|
| 5,848,420 A | * | 12/1998 | Xu | 707/104.1 |
| 5,864,411 A | * | 1/1999 | Norris | 358/527 |
| 6,005,613 A | * | 12/1999 | Endsley et al. | 348/231.6 |
| 6,040,856 A | * | 3/2000 | Sakaegi | 348/231.6 |
| 6,074,111 A | * | 6/2000 | Kasahara | 400/76 |
| 6,373,507 B1 | * | 4/2002 | Camara et al. | 715/825 |
| 6,542,184 B1 | * | 4/2003 | Driscoll et al. | 348/211.3 |
| 6,690,415 B1 | * | 2/2004 | Mamiya | 348/207.1 |
| 6,867,800 B1 | * | 3/2005 | Fukasaka et al. | 348/207.1 |

FOREIGN PATENT DOCUMENTS

| | | |
|---|---|---|
| EP | 0 848 548 A2 | 6/1998 |
| EP | 0 860 978 A2 | 8/1998 |
| JP | 06-176114 | 6/1994 |
| JP | A 09-009014 | 1/1997 |
| JP | 09-098325 | 4/1997 |
| JP | 09-098376 | 4/1997 |
| JP | 09-163209 | 6/1997 |

OTHER PUBLICATIONS

European Patent Office Communication, Application No. 99118642. 0, Date Jan. 16, 2001, p. 1.
European Search Report, Application No. EP 99 11 8642, Date of completion of the search: Jan. 9, 2001, p. 1.
Annex to the European Search Report on European Patent Application No. EP 99 11 8642, p. 1.

* cited by examiner

*Primary Examiner*—Justin P Misleh
(74) *Attorney, Agent, or Firm*—Cowan, Liebowitz & Latman, P.C.

(57) ABSTRACT

This invention has as its object to provide an image input system which is easy to use. To achieve this object, an image input system has an image input device (camera) having a plurality of operation modes, and a computer having a plurality of software programs corresponding to the plurality of operation modes, and when the image input device is connected to the computer, when a power supply of the image input device is turned on after the image input device is connected to the computer, or when the image input device is switched to another operation mode while the image input device is connected to the computer, the software program corresponding to the operation mode of the image input device is automatically started.

7 Claims, 11 Drawing Sheets

IMAGE INPUT SYSTEM CONNECTABLE TO AN IMAGE INPUT DEVICE HAVING A PLURALITY OF OPERATION MODES

BACKGROUND OF THE INVENTION

The present invention relates to a system which connects an image input device such as a digital camera having a plurality of operation modes, and an image processing apparatus such as a personal computer or the like, and inputs and saves images, its control method, and a storage medium.

Conventionally, when an image captured by a digital camera is input to a personal computer, the following procedure is required:

1. The camera is connected to the personal computer via a serial cable.
2. The user starts an application.
3. A TWAIN driver is started from the application.
4. A button or menu command for connecting the camera is pressed.
5. Thumbnails of images in the camera are displayed on the window of the TWAIN driver.
6. The user selects an image to be captured into the personal computer and presses a capture button.
7. The selected image is transferred to the personal computer.

In this manner, in order to capture an image in the digital camera into the personal computer, a given procedure is required, and the user must have certain knowledge. Recently, an RS-232C serial cable is prevalently used as an I/F for connecting a personal computer and camera. This I/F has high compatibility, i.e., is supported by all personal computers, but has low transfer rate. With the use of this I/F, the configuration of image input software such as a TWAIN driver or the like has a fixed procedure for transferring thumbnail data with a small data size first to display image indices in the camera, and then transferring only original images selected by the user.

However, Microsoft Windows98™ formally supports USB (Universal Serial Bus) as a new I/F, and STI (Still Image Captures Architecture and Interfaces) is prepared as a software I/F for digital cameras. USB has a maximum transfer rate of 10 Mbps; an original image can be directly transferred without making the user feel stress as long as it is a compressed file such as a JPEG file or the like. In this manner, an environment for allowing to readily build image input software with a higher degree of freedom without fixing the procedure to that for displaying thumbnails and then transferring only a required original image is in order.

USB can implement hot plugin (a USB device can be plugged or unplugged while a PC is running, and the OS can recognize the plugged or unplugged state), and a mechanism for automatically recognizing the connected camera, and automatically starting a predetermined application associated with the camera by the STI can be provided. As can be seen from the above description, an image can be captured from the camera to the personal computer by the following procedure:

(1) The camera is connected.
(2) The associated application is automatically started. The application automatically starts a corresponding TWAIN driver, which automatically connects the camera and displays thumbnails in the camera.
(3) The user selects an image to be captured and presses a capture button.
(4) The selected image is transferred to the personal computer.

In this manner, steps 2. to 5. in the above procedure can be automated.

The STI has a mechanism for starting corresponding PC software in response to connection of a camera as a trigger. Hence, tedious operation can be greatly reduced, and it is easy even for a novice user of the personal computer to use such system.

However, the STI architecture considers the TWAIN driver as main image input software, and suffers the following shortcomings:

(1) The number of types of applications that can be associated is only one, and the application which runs upon connecting a camera is fixed.

(2) The associated application starts a TWAIN driver corresponding to the camera.

(3) Starting the TWAIN driver means that the application cannot be basically used for purposes other than that for capturing an image into the personal computer.

On the other hand, the digital camera has not only a function of sensing an image, playing back the sensed image on its LCD, and transferring the image to the PC, but also more functions. The number of functions of the digital camera is increasing. For example, the following functions falling outside the range of a function of merely capturing a sensed image into a PC are available:

(1) Slideshow function: All or selected images in the camera are automatically played back on the camera LCD or on a TV via the video output at predetermined time intervals.

(2) On-line image sensing function: An image is previewed on PC software while the PC is connected to the camera. By pressing an image sensing button of that camera or on PC software, the camera senses the previewed image, and automatically transfers the sensed image to the PC. This function become actually usable after USB is supported as a standard I/F. The conventional RS232C can only preview an image for about one frame per sec in a size as small as a thumbnail image, and is not practical.

(3) Divided image synthesis function: In order to sense a panoramic image which cannot be sensed by single image sensing, image sensing is divisionally done a plurality of number of times. These images are automatically stitched by PC synthesis software (to be referred to an stitch synthesis software hereinafter) to form a panoramic image. Upon synthesis, since a common region in neighboring images is detected to automatically recognize the synthesis position, the neighboring images must have common portions. To facilitate such image sensing, the camera has an image sensing mode called a stitch assist mode. At this time, as shown in FIG. 2, a preview image 4b is displayed while displaying a previously sensed image 4a on an LCD, so that the user can easily find the common portion (overlap region). Note that, reference numeral 5 denotes a release switch.

Also, these functions will more often be used in future since they are superior features of digital cameras over film cameras (silver halide cameras).

On the other hand, digital camera users may not always be more or less accustomed with PC operations. That is, users who used film cameras so far may purchase digital cameras as their alternatives. Hence, such users are accustomed with camera operations but are not accustomed with PC operations. Means which allow such users to easily use functions in addition to a function of transferring an image to the personal computer are strongly demanded.

SUMMARY OF THE INVENTION

The present invention has been made in consideration of the above-mentioned problems, and has as its object to provide an image input system which is easy to use, its control method, and a storage medium.

In order to solve the aforementioned problems and to achieve the object, an image input system according to the present invention is characterized by the following arrangement according to its first aspect.

That is, there is provided an image input system comprising an image input device having a plurality of operation modes, and a computer having a plurality of software programs corresponding to the plurality of operation modes, wherein when the image input device is connected to the computer, when a power supply of the image input device is turned on after the image input device is connected to the computer, or when the image input device is switched to another operation mode while the image input device is connected to the computer, the software program corresponding to the operation mode of the image input device is automatically started.

An image input system according to the present invention is characterized by the following arrangement according to its second aspect.

That is, there is provided an image input system comprising an image input device having a plurality of operation modes, and a computer having a single software program which has a plurality of modes corresponding to the plurality of operation modes, wherein when the image input device is connected to the computer, when a power supply of the image input device is turned on after the image input device is connected to the computer, or when the image input device is switched to another operation mode while the image input device is connected to the computer, that one of the plurality of modes of the software in the computer, which corresponds to the operation mode of the image input device, is automatically started.

A method of controlling an image input system according to the present invention is characterized by the following arrangement according to its first aspect.

That is, there is provided a method of controlling an image input system, which comprises an image input device having a plurality of operation modes, and a computer having a plurality of software programs corresponding to the plurality of operation modes, comprising the step of automatically starting the software program corresponding to the operation mode of the image input device, when the image input device is connected to the computer, when a power supply of the image input device is turned on after the image input device is connected to the computer, or when the image input device is switched to another operation mode while the image input device is connected to the computer.

A method of controlling an image input system according to the present invention is characterized by the following arrangement according to its second aspect.

That is, there is provided a method of controlling an image input system, which comprises an image input device having a plurality of operation modes, and a computer having a single software program which has a plurality of modes corresponding to the plurality of operation modes, comprising the step of automatically starting that one of the plurality of modes of the software in the computer, which corresponds to the operation mode of the image input device when the image input device is connected to the computer, when a power supply of the image input device is turned on after the image input device is connected to the computer, or when the image input device is switched to another operation mode while the image input device is connected to the computer.

A storage medium according to the present invention is characterized by the following arrangement according to its first aspect.

That is, there is provided a storage medium that stores a control program for controlling an image input system, which comprises an image input device having a plurality of operation modes, and a computer having a plurality of software programs corresponding to the plurality of operation modes, the control program comprising a code of the step of automatically starting the software program corresponding to the operation mode of the image input device, when the image input device is connected to the computer, when a power supply of the image input device is turned on after the image input device is connected to the computer, or when the image input device is switched to another operation mode while the image input device is connected to the computer.

A storage medium according to the present invention is characterized by the following arrangement according to its second aspect.

That is, there is provided a storage medium that stores a control program for controlling an image input system, which comprises an image input device having a plurality of operation modes, and a computer having a single software program which has a plurality of modes corresponding to the plurality of operation modes, the control program comprising a code of the step of automatically starting that one of the plurality of modes of the software in the computer, which corresponds to the operation mode of the image input device when the image input device is connected to the computer, when a power supply of the image input device is turned on after the image input device is connected to the computer, or when the image input device is switched to another operation mode while the image input device is connected to the computer.

Other objects and advantages besides those discussed above shall be apparent to those skilled in the art from the description of a preferred embodiment of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DETAILED DESCRIPTION OF THE PREFERRED EMBODIMENTS

The preferred embodiments of the present invention will be described in detail hereinafter with reference to the accompanying drawings. Prior to the detailed description, an outline of an embodiment of the present invention will be explained.

In this embodiment, when a camera is connected, an application corresponding to the mode set in the camera is started, is connected to the camera, and automatically executes a predetermined process. When the mode of the camera is changed while the camera is already connected and a predetermined application is running, the application is automatically disconnected from the camera, and automatically ends depending on its type or setups, and an application corresponding to the selected mode is started and is connected to the camera to execute predetermined operation.

In this manner, since operations on the camera main body are mainly used rather than PC operations, and corresponding PC software runs in accordance with setups by means of buttons or switches on the camera main body, a system which is easy even for a user who is not accustomed with PC operations to understand at a glance can be built.

Note that the mode includes the image sensing mode, playback mode, slideshow mode, stitch assist mode, and the like, that have already been described in the paragraphs of the prior art, and these modes can be set using a mode dial switch and push switches of the camera main body, menu items displayed on an LCD panel of the camera, and the like.

Examples of applications which run in correspondence with the respective modes are as follows.

(1) In the playback mode, software which displays images in the camera, and allows the user to browse through them (to be referred to as browser software hereinafter) is automatically started, and automatically reads and displays thumbnails of images in the camera or an original image on its window.

(2) In the image sensing mode, an on-line image sensing mode is automatically set, and on-line image sensing software is automatically started to automatically display a preview image.

(3) In the stitch assist mode, stitch synthesis software is automatically started, searches for images in the camera, which are sensed in the stitch assist mode, automatically transfers images if such images are found, and executes a synthesis process.

(4) In the slideshow mode, slideshow playback software is automatically started, and plays back images on the PC screen at predetermined time intervals or at mouse click timings or depression timings of a predetermined button (a predetermined key on a PC keyboard or a predetermined button on the camera main body), while reading images in the camera.

The respective embodiments will be described below.

First Embodiment

Figure 1:
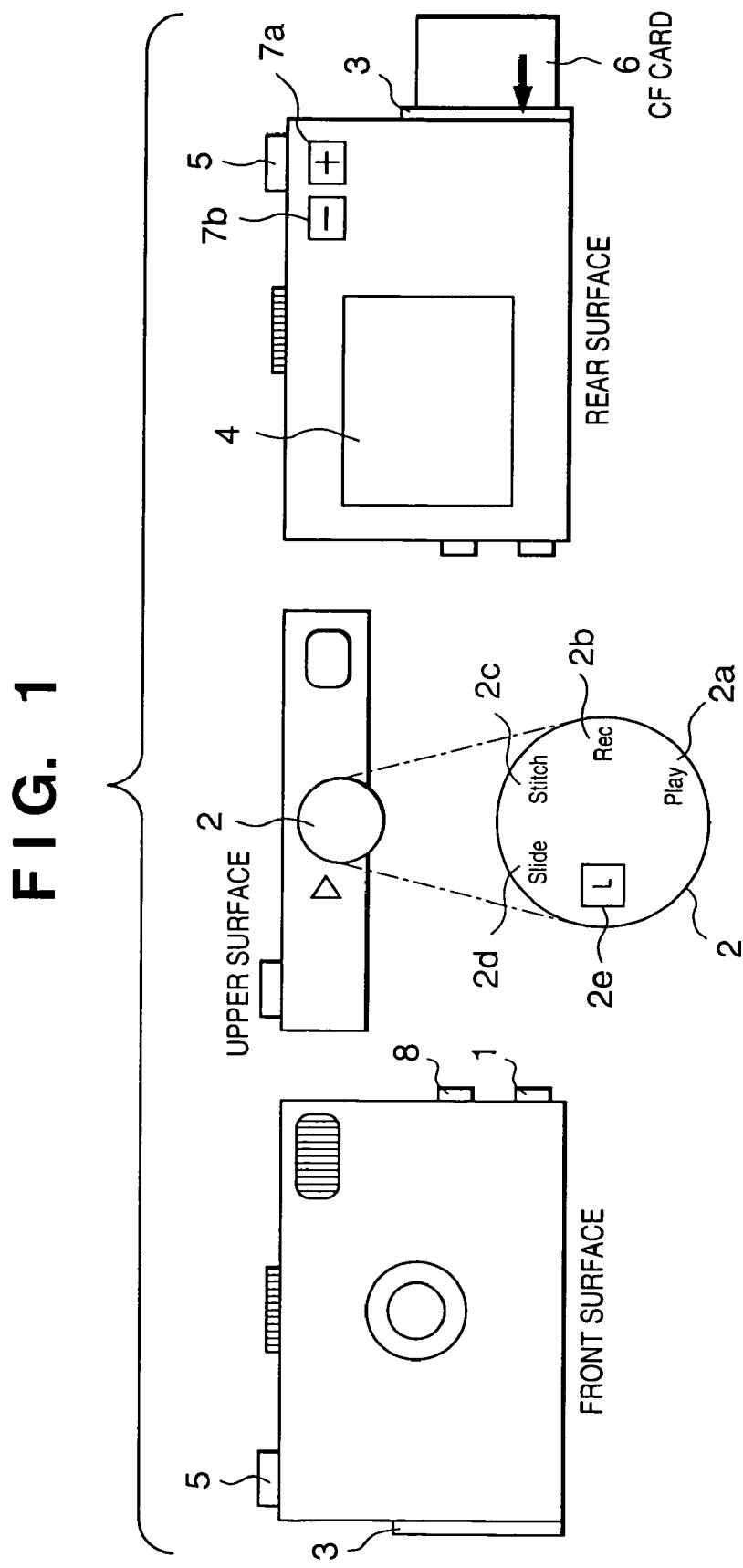
FIG. 1 is a view showing an image input device.

FIG. 1 shows a digital camera used in the first embodiment.

Referring to FIG. 1, reference numeral 1 denotes a USB I/F which is connected to the PC. Reference numeral 2 denotes a mode dial switch which has a playback (Play) mode 2a, image sensing (Rec) mode 2b, stitch assist (Stitch) mode 2c, slideshow playback (Slide) mode 2d, and power OFF 2e. Reference numeral 3 denotes a CF (Compact Flash™) card slot.

Upon using the camera main body alone, when the user turns the mode dial switch from the power OFF position to another mode position and turns on a power switch, the selected mode is started simultaneously. In the image sensing mode, a preview image is displayed on an LCD 4, and an image is sensed by pressing a release switch 5 and is stored in a CF card 6.

In the playback mode, the latest sensed and recorded image is displayed on the LCD 4, and other recorded images are played back in turn by + and − buttons 7a and 7b.

Figure 2:
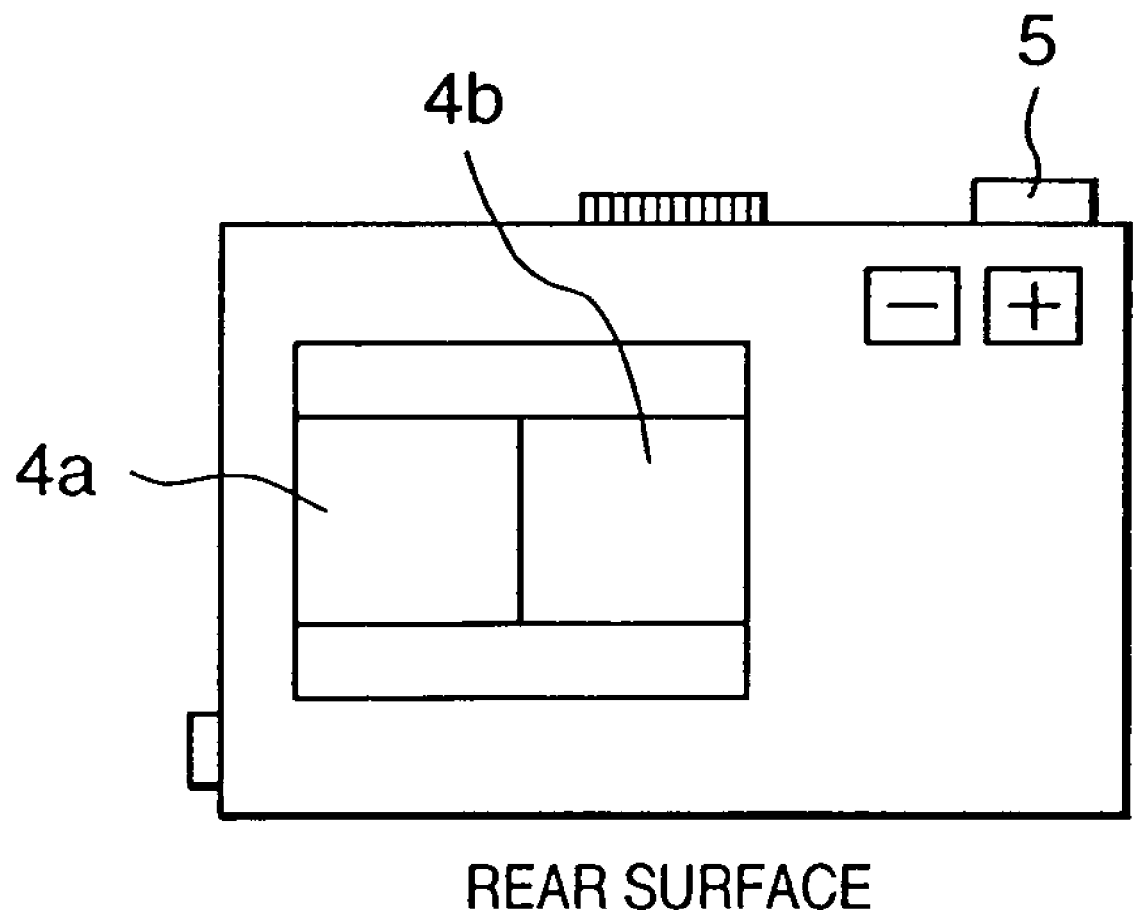
FIG. 2 is an explanatory view of a stitch assist mode.

In the stitch assist mode, as shown in FIG. 2, the already sensed image is displayed on one side 4a of the LCD 4, and a preview image is displayed on the other side 4b and can be sensed.

In the slideshow mode, images recorded in the camera are played back on the LCD 4 or on a TV via a video output 8 at predetermined time intervals. At this time, the displayed image can be switched to the next or previous one using the + and − buttons 7a and 7b.

Figure 3:
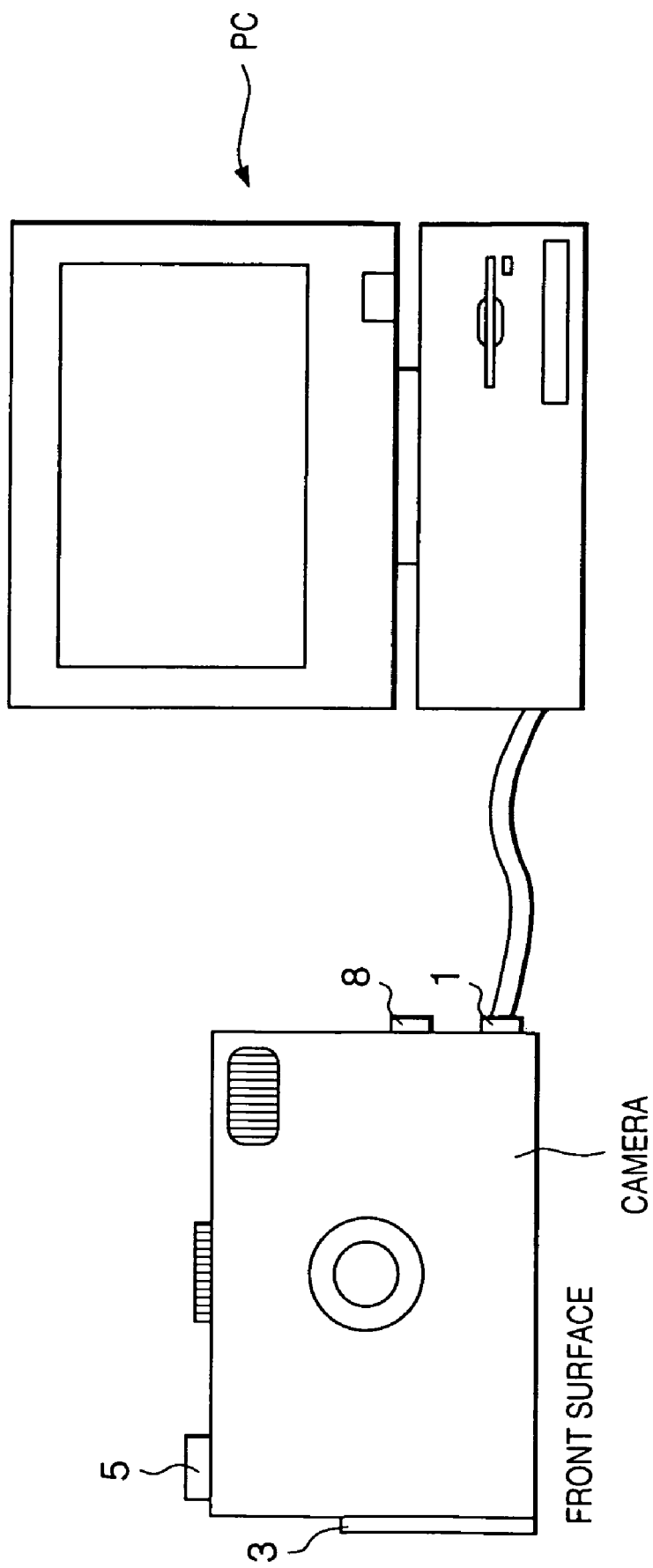
FIG. 3 is a view showing a connection example of the image input device and a computer.

FIG. 3 shows a state wherein the camera and PC are connected via USB.

Figure 4:
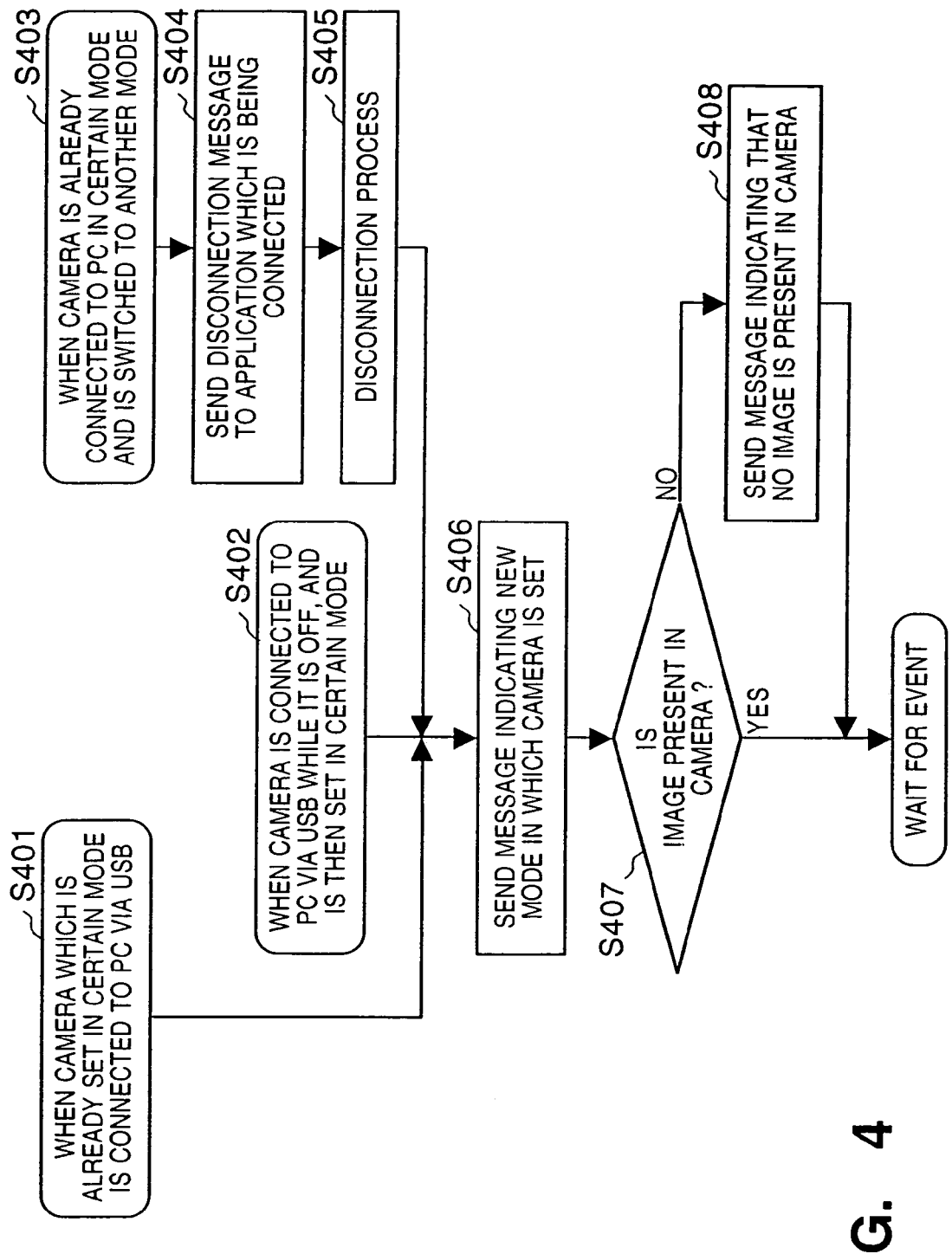
FIG. 4 is a flow chart for explaining operation upon connecting the image input device and computer.

The camera is connected to the PC and can communicate with it in three states shown in FIG. 4.

In the first example, the camera is connected to the PC via USB while its power switch is ON and a given mode is selected (a mode set by the setting position of, e.g., the mode dial switch) (step S401). In this case, the camera sends a message indicating the mode in which the camera is set currently to the PC at a timing that it detects connection to USB (step S406).

In the second example, the camera is connected to USB while its power switch is OFF, and after that, the power switch is turned on. At this time, the camera also sends a message indicating the mode in which the camera is set currently to the PC in accordance with the set mode (step S406).

In the third example, the camera has already been set in a given mode, the corresponding application has already been started, and the camera and application are connected and communicate with each other. In this state, when the user sets the camera in another mode (step S403), the camera sends a disconnection message to the connected application at that timing to disconnect the communication with the application (step S405). At this time, whether the application automatically ends or is disconnected but kept running depends on the setups of the application. A message indicating a new mode in which the camera is set currently is sent to the PC (step S406). After that, the camera checks if sensed images are present in the camera (step S407). If no images are present, the camera also sends a message indicating that no images are present in the camera (step S408).

The aforementioned process is executed first when the camera and PC are connected, and an associated application is started.

Figure 5:
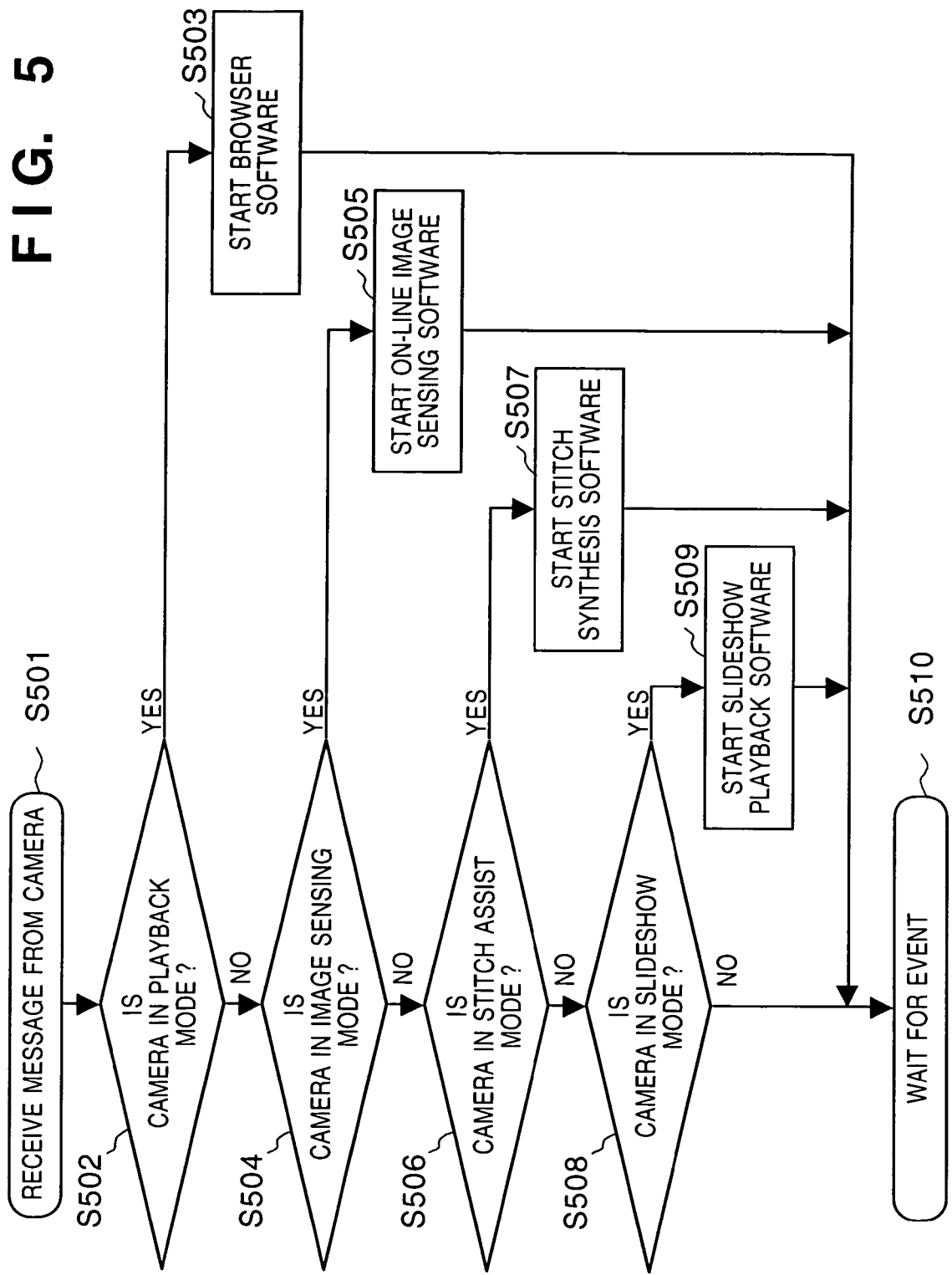
FIG. 5 is a flow chart for explaining operation for starting software corresponding to an operation mode.

The STI starts an associated application in correspondence with the message of each mode. As previously discussed, STI (Still Image Captures Architecture and Interfaces) is prepared as a software I/F for digital cameras. FIG. 5 shows this process.

A case will be exemplified below wherein the mode dial switch 2 is set at the playback mode 2a.

Figure 6:
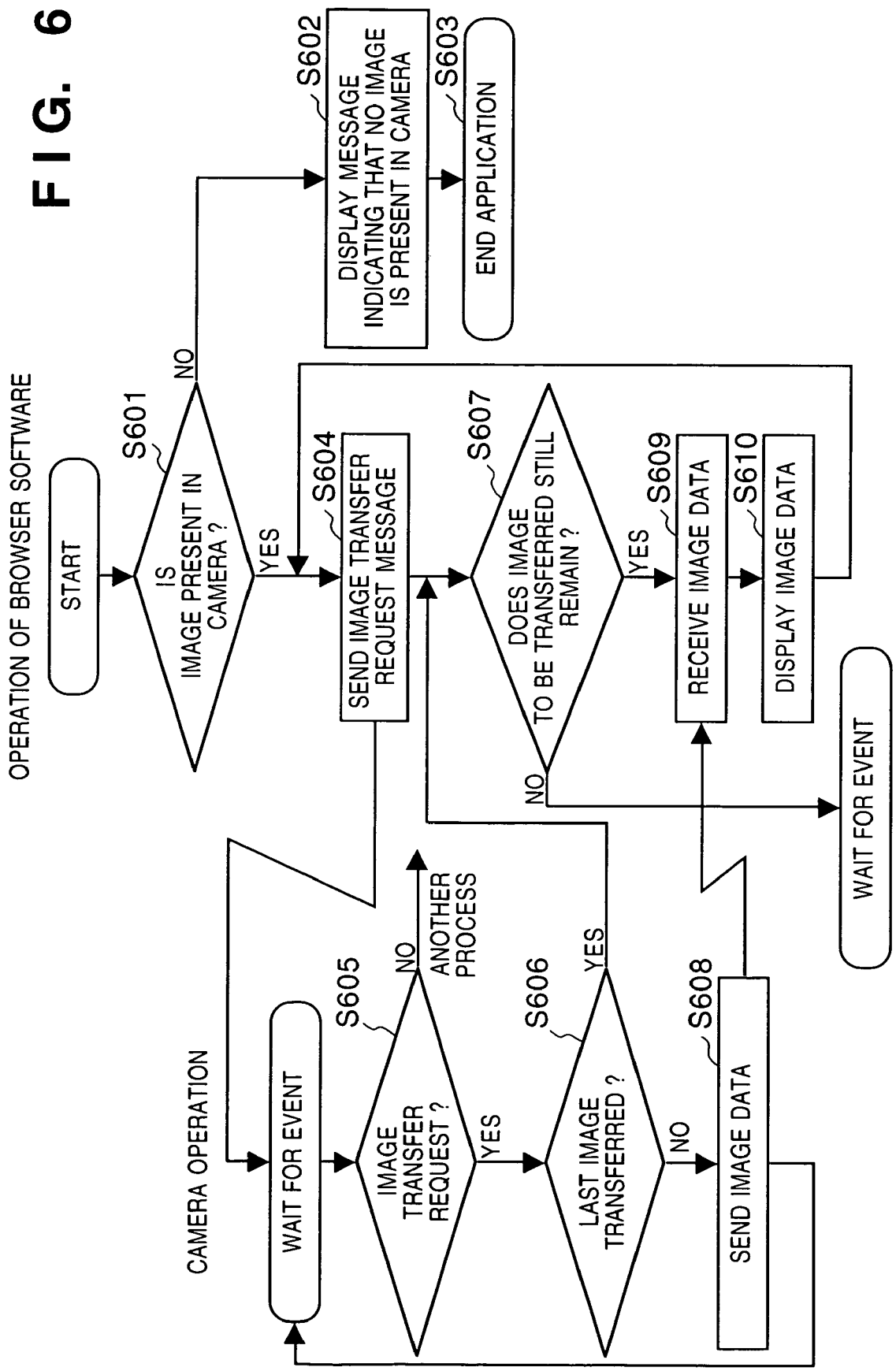
FIG. 6 is a flow chart for explaining operation of browser software started in a playback mode.

FIG. 6 shows operation automatically executed when the browser software associated with the playback mode is started.

It is checked in step S601 if images are present in the camera. This checking step is attained by checking if the message issued in step S408 in FIG. 4 has arrived at the PC. If this message has arrived, the browser software displays a message indicating no image (step S602), and ends itself (step S603).

If images are present, the browser software sends an image transfer request to the camera in step S604. The camera checks if the received message is an image transfer request (step S605), and then checks if all images have already been transferred (step S606). If images to be transferred still remain, the camera sends image data to the browser software in step S608, otherwise the camera moves on to step S607. The browser software receives the image data in step S609, and displays that image data on the PC screen in step S610.

By repeating these steps, all image data in the camera can be automatically loaded from the camera and can be displayed on the PC. From the viewpoint of user operation, all images in the camera can be automatically displayed on the PC by only setting the mode dial switch 2 at the playback mode 2a.

When another mode is selected at the camera while the browser software is connected to the camera, or when the power switch of the camera is turned off, the camera sends a corresponding message to the browser software. At this time, the browser software executes a process for disconnecting the communication with the camera, and then executes one of the following three options.

The first option automatically ends the browser software, the second option displays a message indicating that the connection with the camera is disconnected by user operation to the user, and prompts the user to select whether the browser software is to end or continue, and the third option continues to run the browser software. These options can be selected from a setup menu of the browser software. As a default, the second option that prompts the user to select whether the browser software is to end or continue is preferably set.

Figure 8:
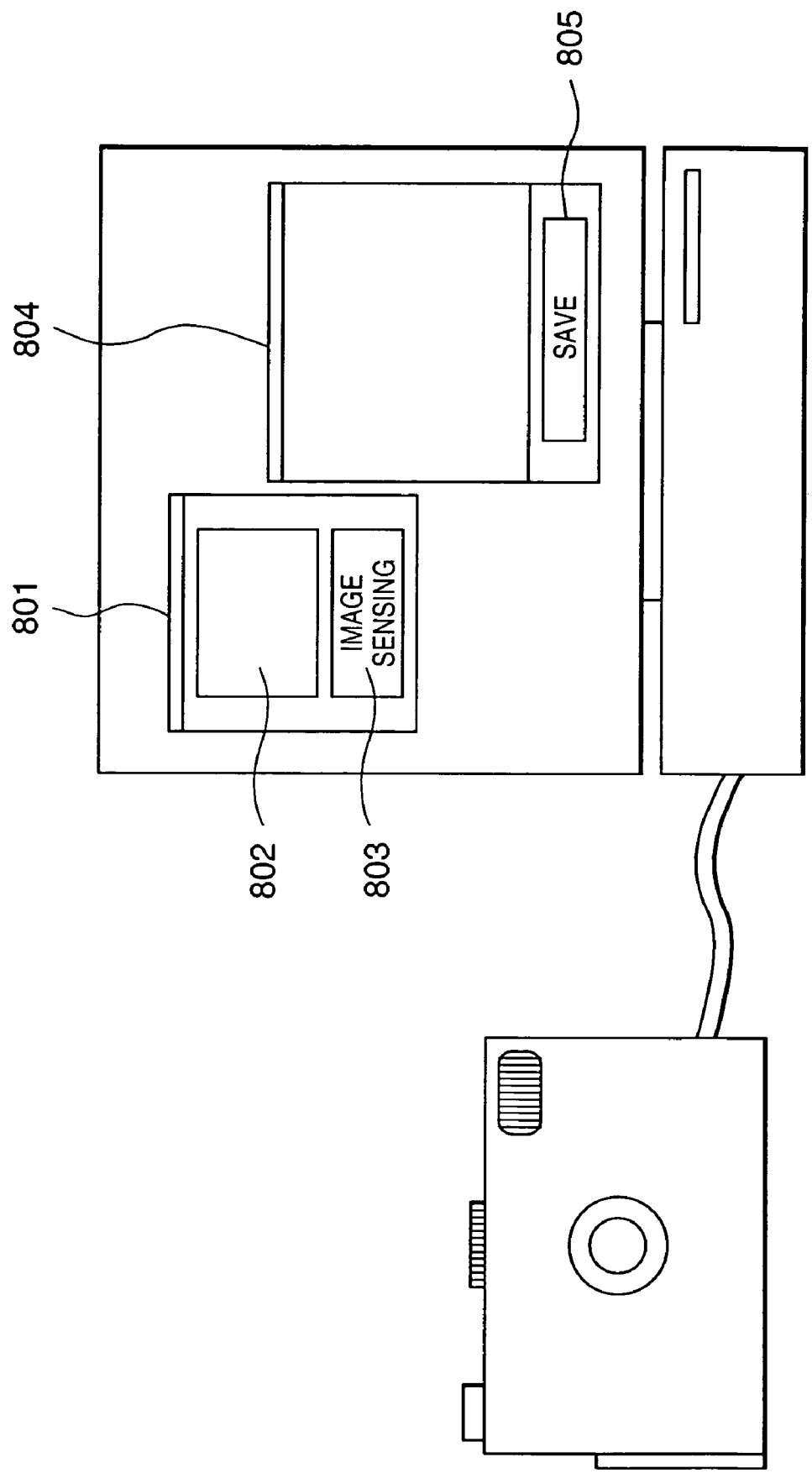
FIG. 8 is a view showing a display example of on-line image sensing software.

A case will be explained below wherein the mode dial switch is set at the Rec mode 2b. In this case, the on-line image sensing software is started. FIG. 8 shows an example of the on-line image sensing software. An image which is being currently seen by the camera is displayed on a preview area 802 in a window 801 as a preview image. When the user presses an image sensing button 803 at a shutter chance while observing the preview image, the camera senses the image, and sensed image data is displayed on a window 804. When the user presses a save button, the sensed image data can be saved in storage 805 as an image file.

Figure 7:
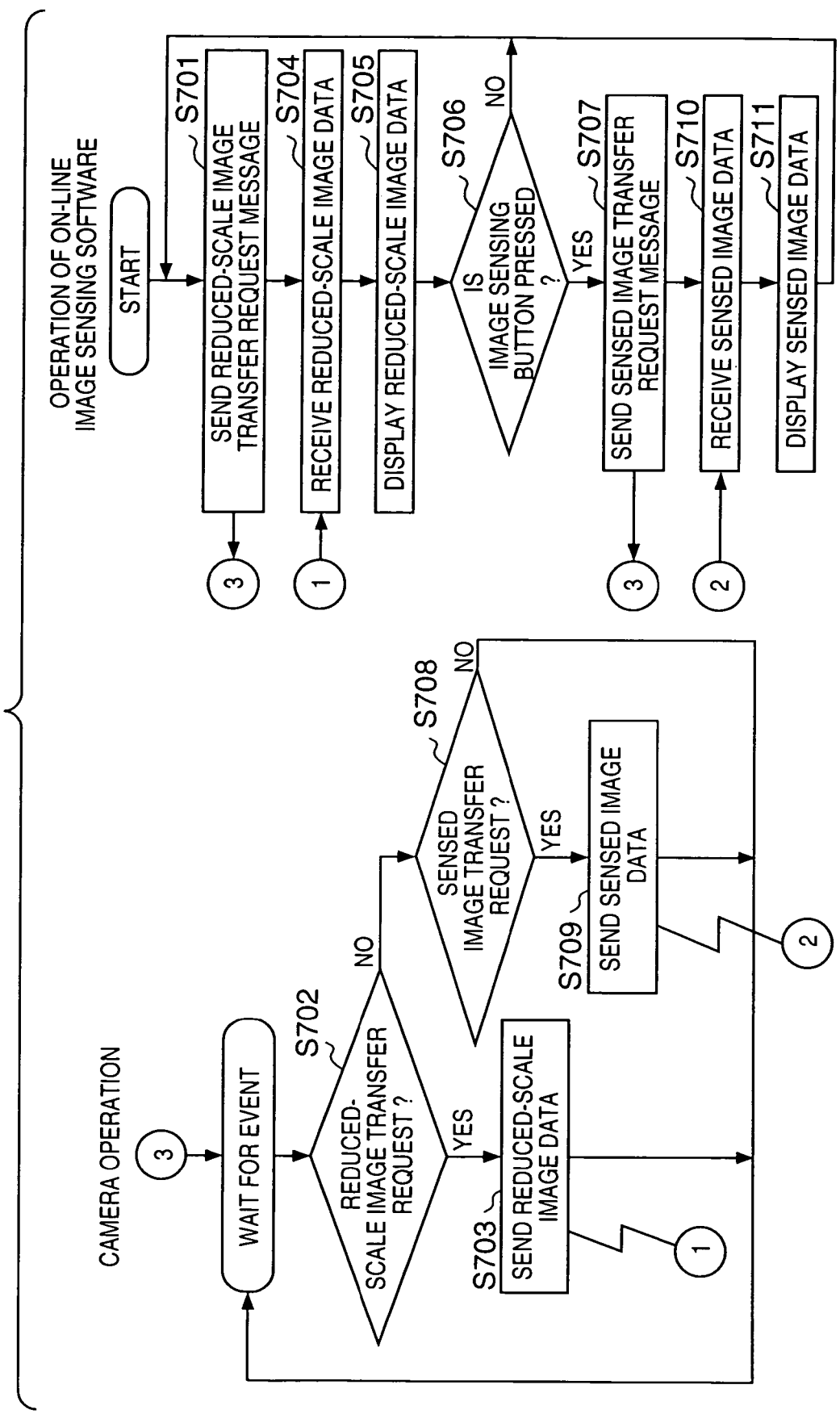
FIG. 7 is a flow chart for explaining operation of on-line image sensing software started in an image sensing mode.

FIG. 7 is a flow chart showing operation executed when the on-line image sensing software is started.

When the mode dial switch 2 is set at the Rec mode 2b, the on-line image sensing software is automatically started. The on-line image sensing software sends a reduced-scale image transmission request to the camera (step S701). This reduced-scale image is to be displayed on the preview area 802. In order to attain preview display that moves as smooth as possible, i.e., to transfer image frames as much as possible, a reduced-scale image is requested in place of a full-size image which is equal to the sensed image size.

Upon receiving this request (step S702), the camera sends reduced-scale image data (step S703). The on-line image sensing software receives that image data in step S704, and displays the received data on the preview area 802 in step S705. By repeating these steps, a preview image which is being currently sensed by the camera is displayed as a moving image on the preview area 802.

When the user has pressed the image sensing button 803, the control leaves the loop based on the checking result in step S706, and a sensed image transfer request is sent in step S707. Upon receiving this message (step S708), the camera senses an image, and sends sensed full-size image data in step S709. The on-line image sensing software receives this image data in step S710, and displays it on the window 804 in FIG. 8 in step S711.

In this way, the user can automatically preview an image on-line by only setting the mode dial switch 2 at the Rec mode 2b, and can sense that image by pressing the image sensing button on the PC.

When another mode is selected at the camera while the on-line image sensing software is connected to the camera, or when the power switch of the camera is turned off, the camera sends a corresponding message to the on-line image sensing software. At this time, the on-line image sensing software executes a process for disconnecting the communication with the camera, and then automatically ends itself. The aforementioned browser software has options for selecting, e.g., whether or not the software continues to run, but such options are not available for this software. This is because the on-line image sensing software does not function at all unless it is connected to the camera.

Figure 9:
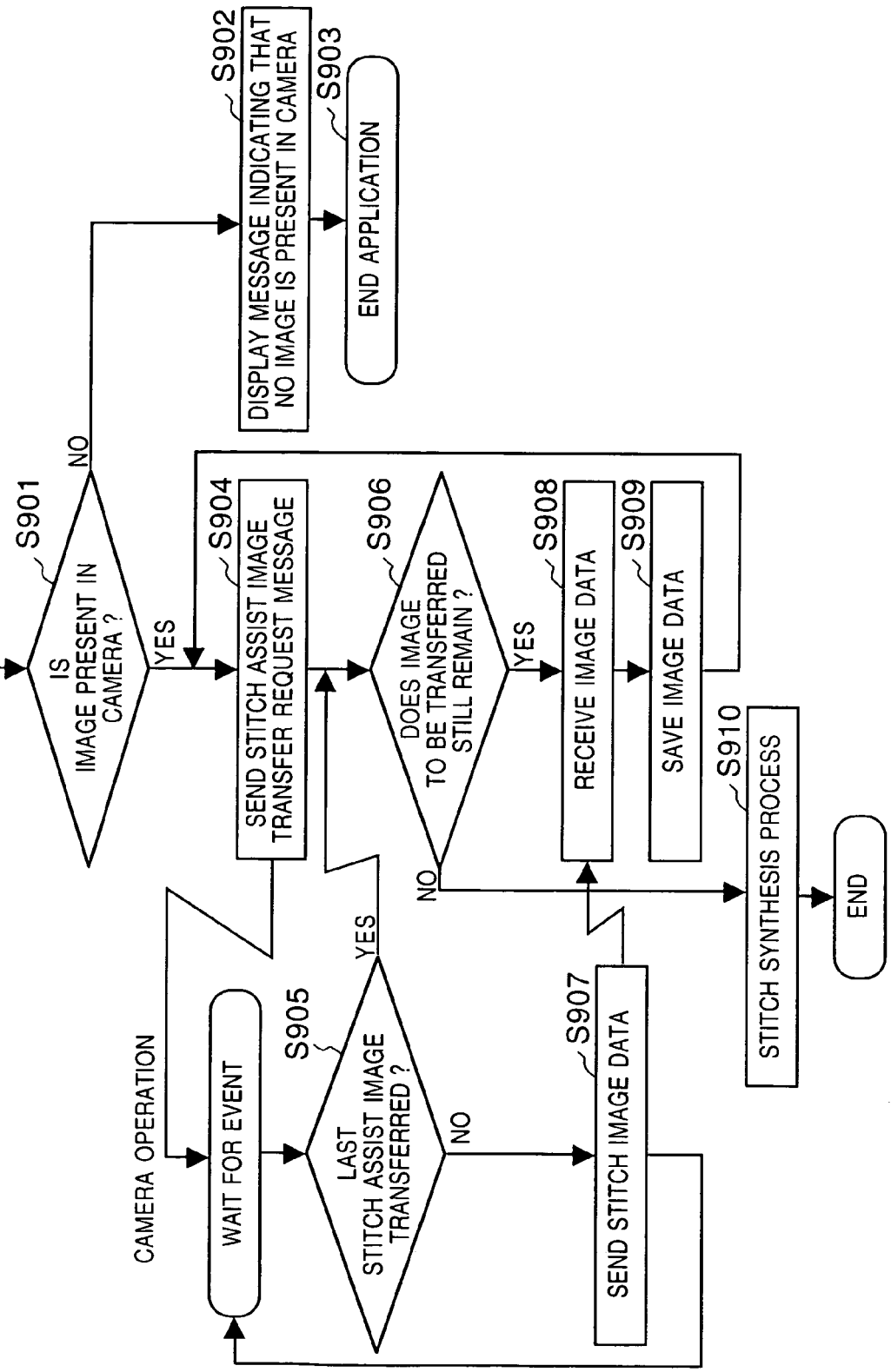
FIG. 9 is a flow chart for explaining operation of stitch synthesis software started in the stitch assist mode.

A case will be exemplified below wherein the mode dial switch 2 is set at the stitch assist mode 2c. In this case, the stitch synthesis software is started. FIG. 9 shows operation at that time.

It is checked in step S901 if images are present in the camera. This checking step is attained by checking if the message issued in step S408 in FIG. 4 has arrived at the PC. If this message has arrived, the stitch synthesis software displays a message indicating that no images are stored in the camera (step S902), and ends (step S903).

If images are present, the stitch synthesis software sends a transfer request of images sensed in the stitch assist mode to the camera in step S904. Upon receiving this request, the camera checks if all stitch assist images have already been transferred (S905). If stitch assist image to be transferred still remain, image data is transferred to the stitch synthesis software in step S907 otherwise the camera moves on to step S906.

The stitch synthesis software receives this image data in step S908, and saves that image data in a file in step S909. By repeating these steps, all stitch assist image data in the camera can be automatically loaded from the camera. After that, the saved stitch assist images are read out, and a process for stitching these images to obtain a single synthesis image is executed in step S910.

From the viewpoint of user operation, images can be sensed in the stitch assist mode by setting the mode dial switch 2 at the stitch assist mode 2c, and all the stitch assist images in the camera can be automatically loaded into the PC and can be synthesized by only connecting the camera to the PC.

When another mode is selected at the camera while the stitch synthesis software is connected to the camera, or when the power switch of the camera is turned off, the camera sends a corresponding message to the stitch synthesis software. At this time, the stitch synthesis software disconnects the connection with the camera. In this case, if all the stitch assist images in the camera have already been loaded, the stitch synthesis software continues a synthesis process. However, if all the images have not been loaded yet, the stitch synthesis software automatically ends itself since it cannot execute a synthesis process.

Figure 10:
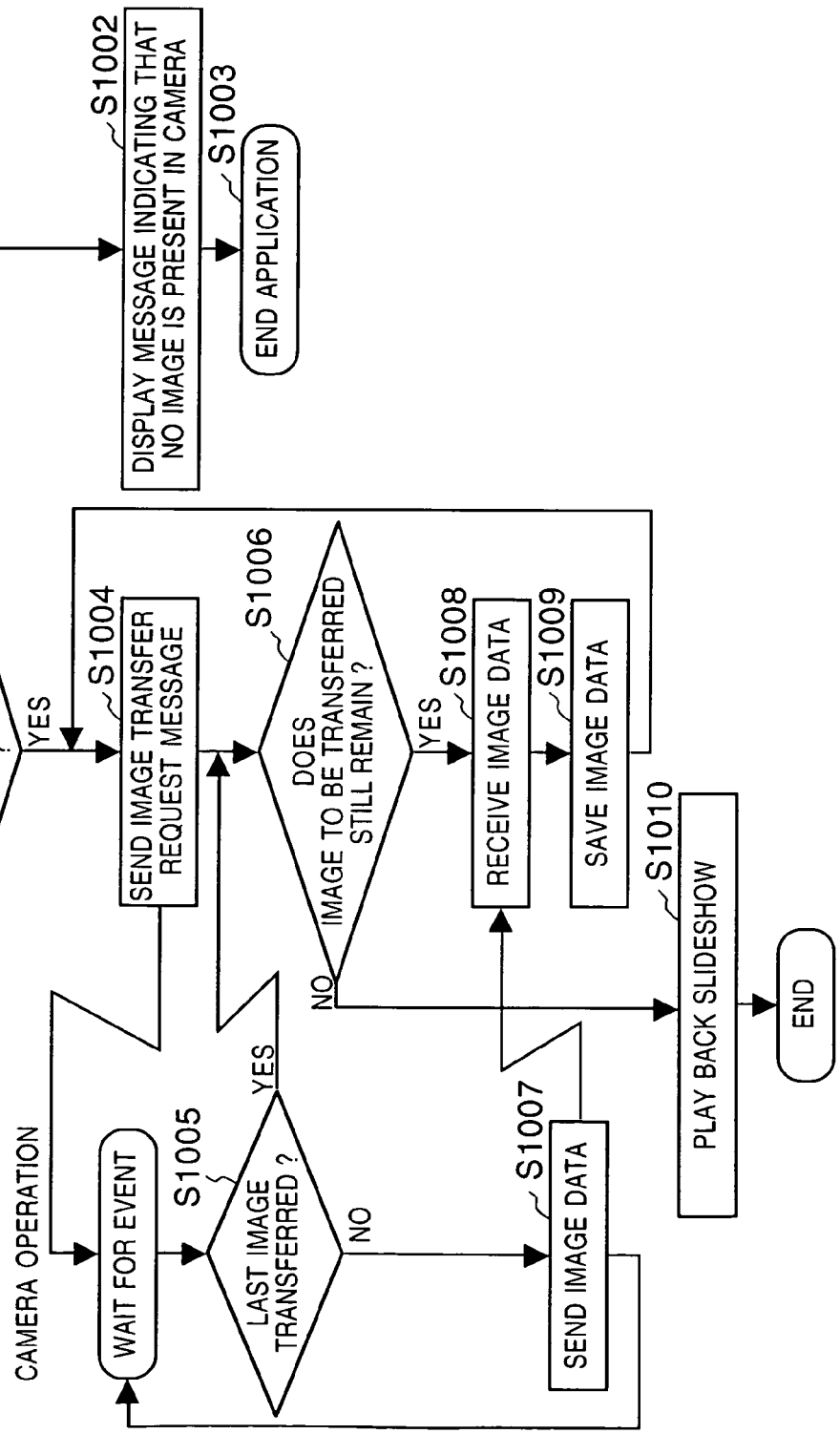
FIG. 10 is a flow chart for explaining operation of slideshow playback software started in a slideshow playback mode.

A case will be exemplified below wherein the mode dial switch 2 is set at the slideshow mode 2d. In this case, the slideshow playback software is started. FIG. 10 shows operation at that time.

It is checked in step S1001 if images are present in the camera. This checking step is attained by checking if the message issued in step S408 in FIG. 4 has arrived at the PC. If this message has arrived, the slideshow playback software displays a message indicating that no images are stored in the camera (step S1002), and ends itself (step S1003).

If images are present, the slideshow playback software sends an image transfer request to the camera in step S1004. Upon receiving the request, the camera checks if all images have already been transferred (step S1005).

If images to be transferred still remain, image data is sent to the slideshow playback software in step S1007, otherwise the camera moves on to step S1006.

The slideshow playback software receives the image data in step S1008, and saves that image data in a file in step S1009.

By repeating these steps, all image data in the camera can be loaded from the camera. After that, the saved images are read out, and slideshow playback of these images is executed on the PC screen in step S1010.

From the viewpoint of user operations, all images in the camera can be automatically loaded and can be played back as a slideshow by only setting the mode dial switch 2 at the slideshow mode 2d.

When another mode is selected at the camera while the slideshow playback software is connected to the camera, or when the power switch of the camera is turned off, the camera sends a corresponding message to the slideshow playback software. At this time, the slideshow playback software disconnects the connection with the camera. In this case, if all the images in the camera have already been loaded, the slideshow playback software continues slideshow playback. However, if all the images have not been loaded yet, the slideshow playback software automatically ends itself since it cannot execute slideshow playback.

Second Embodiment

In the first embodiment, different software programs are started in correspondence with the operation modes of the camera. In this embodiment, a single software program is started in an operation mode corresponding to the operation mode of the camera.

In this case, whether different software programs are started or single software is started in different modes is different from the above embodiment, and only the difference will be explained below.

Figure 11:
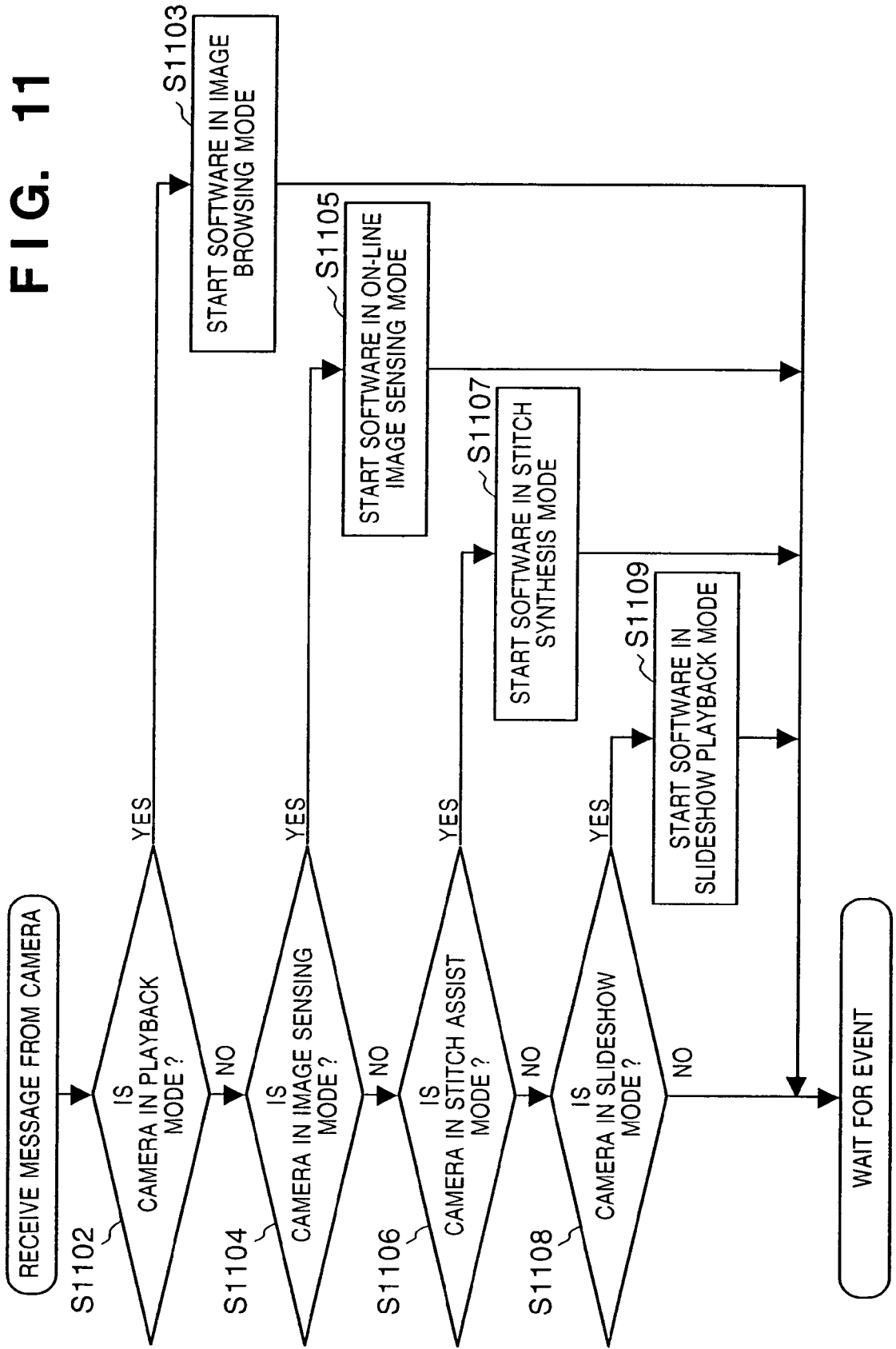
FIG. 11 is a flow chart for explaining operation for starting software in a mode corresponding to an operation mode.

As shown in FIG. 11, the software is started in different modes in correspondence with the operation modes of the camera.

If it is determined in step S1102 that the camera is in the playback mode, the software is started in an image browsing mode in step S1103. The subsequent operation is the same as that described in the first embodiment.

If it is determined in step S1104 that the camera is in the image sensing mode, the software is started in an on-line image sensing mode in step S1105. The subsequent operation is the same as that described in the first embodiment.

If it is determined in step S1106 that the camera is in the stitch assist mode, the software is started in a stitch synthesis mode in step S1107. The subsequent operation is the same as that described in the first embodiment.

If it is determined in step S1108 that the camera is in the slideshow mode, the software is started in a slideshow playback mode in step S1109. The subsequent operation is the same as that described in the first embodiment.

Other Embodiments

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

To restate, according to the present invention, software program can be automatically started in correspondence with the mode set in the camera. Or a software program can be started in a software mode corresponding to the mode set in the camera. In this manner, since operations on the camera main body are mainly used rather than PC operations, and corresponding PC software runs in accordance with setups by means of buttons or switches on the camera main body, a system which is easy even for a user who is not accustomed with PC operations to understand at a glance can be built.

The present invention is not limited to the above embodiments and various changes and modifications can be made within the spirit and scope of the present invention. Therefore, to apprise the public of the scope of the present invention the following claims are made.

What is claimed is:

1. An image input system, which includes an image input device having a plurality of operation modes and a computer having a plurality software programs each corresponding to each of the plurality of operation modes of the image input device, comprising:

a transmitting unit adapted to transmit information indicating an operation mode set in said image input device to said computer when said image input device and said computer are connected with each other and a communication between said image input device and said computer is established;

a receiving unit arranged in said computer and adapted to receive the information indicating the operation mode set in said image input device; and a control unit adapted to select a software program, which corresponds to the operation mode set in said image input device, from the plurality of software programs and make start the selected software program wherein when said image input device and said computer are disconnected in a state that said image input device and said computer are connected with each other and the software program corresponding to the operation mode of said image input device is operating, it is set in every software whether the software is kept in an operating state or an operation of the software is terminated.

2. The system according to claim 1, wherein the operation modes of said image input device include at least one of an image playback mode, image sensing mode, panoramic image sensing mode, and slideshow playback mode.

3. The system according to claim 2, wherein in case that the operation mode of said image input device is the image playback mode, said control unit selects an image browsing software and makes start the image browsing software, and the image browsing software loads all images in said image input device.

4. The system according to claim 2, wherein in case that the operation mode of said image input device is the image sensing mode, said control unit selects an image sensing software and makes start the image sensing software, and the image sensing software displays a preview image and senses an image on said computer.

5. The system according to claim 2, wherein in case that the operation mode of said image input device is the panoramic image sensing mode, said control unit selects a panoramic image generation software and makes start the panoramic image generation software, and the panoramic image generation software loads images which are sensed in the panoramic image sensing mode and stored in said image input device, and executes a synthesis process of the loaded images.

6. The system according to claim 2, wherein in case that the operation mode of said image input device is the slideshow playback mode, said control unit selects a slideshow playback software and makes start the slideshow playback software, and the slideshow playback software loads images in said image input device and displays the loaded images on a screen of said computer.

7. A method of controlling an image input system, which includes an image input device having a plurality of operation modes and a computer having a plurality software programs each corresponding to each of the plurality of operation modes of the image input device, comprising:

a transmitting step of transmitting information indicating an operation mode set in said image input device to said computer when said image input device and said computer are connected with each other and a communication between said image input device and said computer is established;

a receiving step of receiving by the computer the information indicating the operation mode set in said image input device; and a control step of selecting a software program, which corresponds to the operation mode set in said image input device, from the plurality of software programs and making start the selected software program wherein when said image input device and said computer are disconnected in a state that said image input device and said computer are connected with each other and the software program corresponding to the operation mode of said image input device is operating, it is set in every software whether the software is kept in an operating state or an operation of the software is terminated.

* * * * *